Patented Nov. 27, 1951

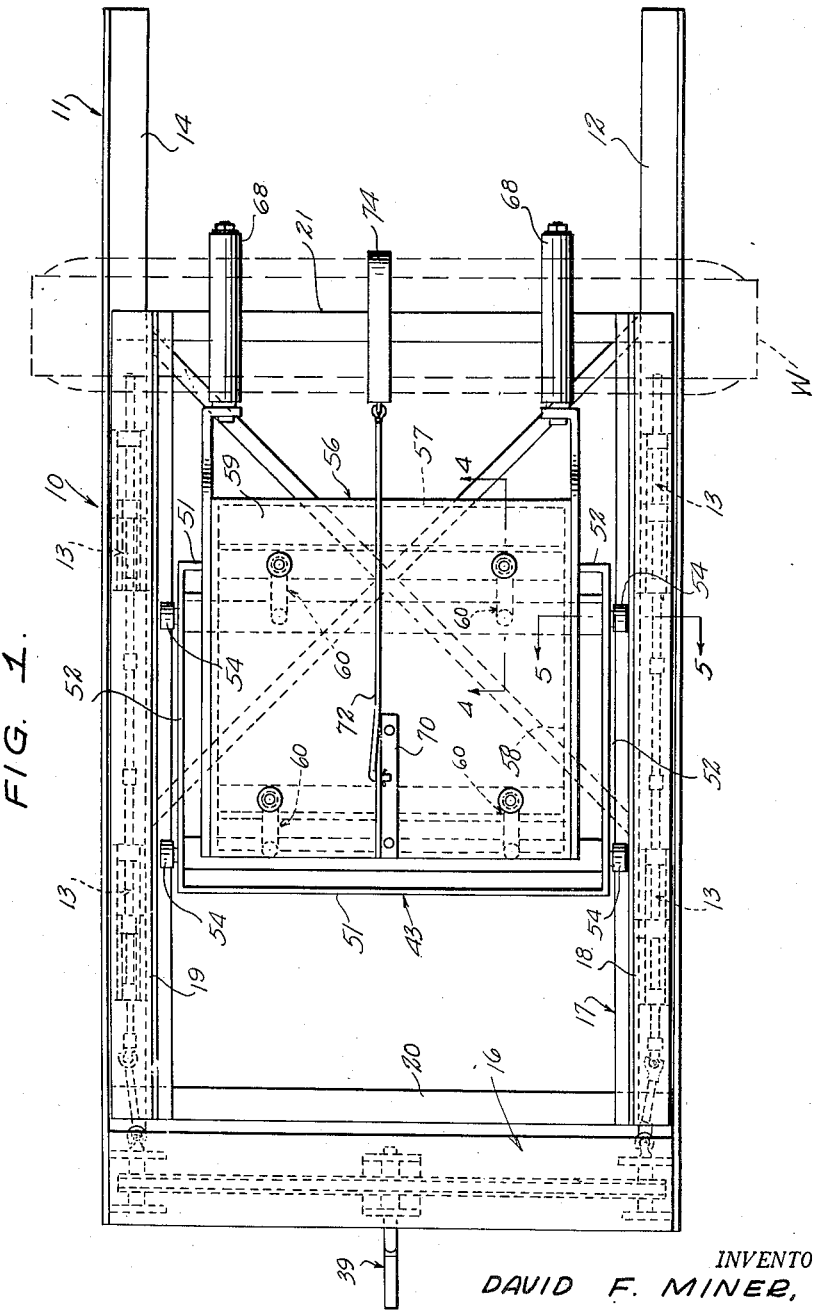

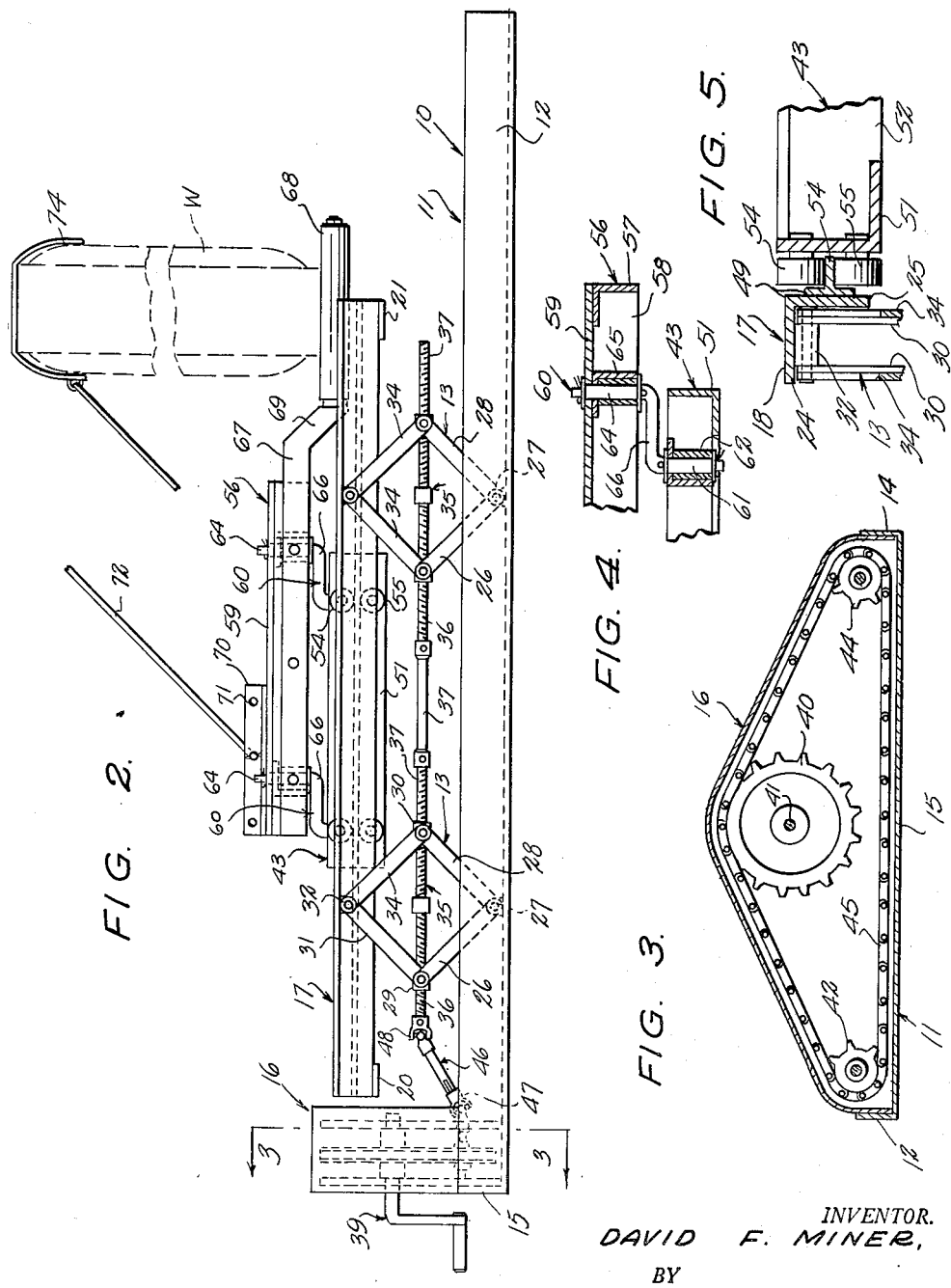

2,576,627

UNITED STATES PATENT OFFICE 2,576,627

TIRE AND WHEEL JACK

David F. Miner, Seaford, Del.

Application August 26, 1949, Serial No. 112,541

4 Claims. (Cl. 214—1)

1

This invention relates to a tire and wheel-lifting mechanism or jack, and more particularly to a wheel jack having a vertically and horizontally-adjustable wheel-supporting carriage.

It is an object of this invention to provide a jack of the kind to be more particularly described hereinafter for use in lifting and applying or removing heavy single and dual wheels from trucks and buses, as in garages, on farms, road contract work, and the like. The jack of this invention is especially applicable for use by long-distance truckers to provide for the changing of tires by one man on the open road.

Another object of this invention is to provide a tire and wheel-lifting device of this kind which may be readily handled by one man for lifting, swinging and rotating a wheel to be secured on the wheel hub of a vehicle.

Still another object of this invention is to provide a tire and wheel jack which may be readily manufactured by conventional manufacturing means and methods at an economical cost to provide for its wide distribution and use.

A further object of this invention is to provide a wheel jack having a vertically-movable platform and a horizontally-shiftable carriage slidable along the length of the platform for shifting a wheel to the proper position for attachment to the hub of a vehicle, the wheel being rotatable on the carriage for properly aligning the hub studs with the openings of the wheel.

With the above and other objects in view, my invention consists in the arrangement, combination and details of construction disclosed in the drawings and specification, and then more particularly pointed out in the appended claims.

In the drawings:

Figure 1 is a top plan view of a jack or lifting device constructed according to an embodiment of my invention;

Figure 2 is a side elevation thereof;

Figure 3 is a transverse section taken on the line 3—3 of Figure 2;

Figure 4 is a fragmentary longitudinal section taken on the line 4—4 of Figure 1;

Figure 5 is a fragmentary detail transverse section taken on the line 5—5 of Figure 1.

Referring to the drawings, the numeral 10 designates generally a wheel jack or lifting device especially applicable for lifting the single or dual wheels of trucks, buses and similar vehicles, for securing the tires and wheels on the axles or wheel hubs of the vehicle. As the wheels of this type are of considerable weight, and as it is necessary that the wheels be supported and positioned in a certain manner prior to their installation on the hub, the jack 10 is formed for lifting, sliding and rotating the wheel to its proper position for sliding engagement on the wheel studs of the vehicle.

The lifting device 10 comprises a horizontal base 11 whch is substantially U-shaped in configuration, having a pair of longitudinally extending angle iron side arms 12 and 14. The side arms 12 and 14 are unconnected at their forward ends and are secured together at their rearward ends by a transverse connecting bar 15 and a sprocket and chain housing 16 which is fixed on the transverse bar or bight member 15 and extends upwardly therefrom, as clearly shown in Figure 2 of the drawings.

An open rectangular upper frame 17 is supported upon and above the base frame 11 by a plurality of scissor jack members 18 which are connected at their lower ends to the side arms of the base frame and at their upper ends to the side members of the upper frame 17. The upper frame 17 comprises a pair of longitudinally extending side members 19 connected together at their opposite ends by a pair of transverse frame members 20 and 21. The longitudinally-extending side frame members 18 and 19 are formed of angle iron having a horizontal flange 24 and a depending flange 25 formed integrally with the inner longitudinal edge of the horizontal flange 24. The upper frame is disposed within the sides and ends of the base frame 11 so that the upper frame 17 can nest within the base frame 11 in the fully retracted positions of the scissor jacks 10.

Each of the scissor jack members 13 is formed of a pair of transversely-spaced-apart, upwardly and rearwardly-inclined lower links 26 which are pivoted at their lower ends on a bearing member 27 fixed on one of the longitudinally-extending base side members. A pair of forwardly and upwardly-directed lower links 28 are also pivoted on the bearing member 27, the pairs of links 26 and 28 being disposed in overlying relation at one end of the pivot member 27, the pairs of links 26 and 28 being extensible in opposite directions upon operation of the jack 13. The upper ends of the rearwardly-extending links 26 are pivotally connected on the opposite sides of a nut member 29 and the forward, upper ends of the forwardly-extending links 28 are pivotally connected on a nut member 30. A pair of downwardly and rearwardly-swingable links 31 are pivoted between the nut member 29 and one of the side frame members of the upper frame 17, the lower ends of each of the links 31 being pivotally connected to the nut member 29 and the upper ends of the links 31 being pivotally connected on a bearing or pivot member 32 which is fixed on the lower side of a side member of the upper frame, as shown in Figure 5 of the drawings. One of the pairs of links is pivotally supported on one end of the transverse pivot member 32, and the other links are pivotally supported on the other end of the same pivot member, and a pair of forwardly-extendable links 34 overlie these links on the outer side thereof, and the spaced-apart outer links 34 are pivotally connected on the outer side of the nut member 30. A longitudinally-extending screw member 35 is threadably engaged through each of the nut elements 29 and 30, the screw member 35 being disposed in a horizontal plane parallel to the base frame 11 and the upper frame 17. The forward section 36 of each of the screw member 35 is threaded in one direction, while the rearward section 37 of the same screw element is threaded in the opposite direction, so that upon rotation of the screw member 35, the nut members 29 and 30 will be caused to move together or apart, depending upon the direction of rotation of the screw. The screw sections on each side of the base frame 11 are connected together by connecting bars 38, the forward end of the rearward section being fixedly connected to the rearward end of the forward section so that rotation of one of the screw sections will directly produce simultaneous rotation of the other screw section.

For actuating all of the jack members 13 simultaneously, a crank member 39 is rotatably supported on the housing 16, intermediate the length thereof, and a master gear or sprocket 40 is fixed on the inwardly-extending arm 41 of the crank 39. A small sprocket 42 is rotatably supported in one end of the housing 16 in alignment with one of the longitudinal base frame members, as the base frame member 12, and a similar reduced sprocket 44 is rotatably supported in the other end of the housing 16, substantially in longitudinal alignment with the other of the longitudinally-extending base frame members 14. A chain 45 is trained about the upper edge of the master sprocket 40 and about the outer surfaces of the outwardly-disposed small sprockets 42, as clearly shown in Figure 3 of the drawings, so that rotation of the crank 39 will rotate the driven sprockets 42 and 44 simultaneously. Both the sprockets 42 and 44 are connected to the adjacent screws 35 by suitable shafts 46 which are connected to the sprocket shafts by universal joints 47 and to the rearmost end of the adjacent screws 35 by similar universal joints 48. The connecting shaft between the universal joints 47 and 48 is splined or otherwise formed for providing the rotation of the universal joints 47 and 48, while also providing for longitudinal extension and construction of the universal joints as required by the various adjustments of the jacks 13 relative to the sprockets and housing 16.

A longitudinally-extending rail 49 is fixedly supported on the inward side of the vertical flange 25 of each of the side frame members 18 and 19 of the upper frame 17, the rail 49 including a laterally inwardly-extending horizontal flange 50. The rails 49 extend along the entire length of the side frame members 18 and 19 and a platform 43 is rollably supported on the flanges 50 of the rails 49 to provide for the longitudinal sliding movement of the platform 43 on the frame 17. The platform 43 is formed with a pair of longitudinally-extending side frame members 52 and transverse end members 51 fixedly secured between the front and rear ends of the respective side frame members 52. A plurality of vertically-spaced-apart rollers 54 and 55 are rotatably supported on the opposite ends of each of the side frame members 52, as clearly shown in Figure 5 of the drawings. The uppermost roller 54 being engaged on the upper surface of the flange 50, and the lower roller 54 being rotatably engaged with the lower surface of the flange 50, the engagement of the lower roller providing for the secure engagement of the platform 43 on the upper frame 17 when a weight is being lifted by the jack 10. A similar pair of rollers 54 and 55 are carried by each end of each of the platform side members 52.

A carriage 56 is swingably supported above the platform 43 for swinging longitudinally and laterally or transversely of the platform 43 and the base 11. The carriage 56 is formed with a pair of transversely-spaced-apart, longitudinally-extending side frame members 57 connected together at their opposite ends by transverse frame members 58 and a flat plate 59 is fixed on the upper side of the frame thus defined by the longitudinally and transversely-extending frame members 57 and 58. A crankarm 60 is pivotally connected between each corner of the carriage 56, and the platform 43 therebelow. Each of the crank arms 60 is formed with a pivot pin 61 which is rotatably engageable in one end of the transverse supporting member 62 carried by the platform 43. A similar but oppositely-extending crank pin 64 is rotatably engaged through an end of the transverse supporting member 65 carried by the carriage 56. A pair of transverse braces or supporting members 65 are fixed on the lower side of the carriage 56 at the forward and rear ends thereof. A connecting link or arm 66 is fixed to the confronting ends of the crank pins 61 and 64 of each of the kingpins 60 in the manner clearly shown in Figure 4 of the drawings. The engagement of the plurality of kingpins 60 between the platform 43 and carriage 56 provides for the swinging of the carriage 56 longitudinally and transversely of the platform and supporting base 11.

A forwardly-extending side arm 67 is fixed on the opposite sides of the carriage 56 and extends longitudinally thereof. Each of the side arms 67 extends forwardly beyond the forward edge of the carriage 56, and a roller 68 is rotatably supported on the extreme outwardly-extending end of each of the side arms 67. The roller 68 rotatably engaged about the outer end of each of the side arms is disposed in a horizontal plane parallel to the plane of the platform 43 and carriage 56, those planes being also parallel to the plane of the base member 11. The rollers 68, being on the forward ends of the side arms 67, are transversely spaced apart and are rotatable on a longitudinal axis, as defined by the forward extension of the side arms. As shown in Figure 2 of the drawings, the rollers 68 are depressed or downwardly offset from the major longitudinal axis of the side arms 67, being secured to the forward ends of the side arms by a downwardly and forwardly-inclined connecting member 69 which is fixed to or preferably formed integrally with the side arm. The downward depression of the rollers 68 provides for the more compact arrangement of the folded or retracted jack 10, and also provides for the more suitable engagement of the rollers 68 under a wheel W to be secured on the vehicle.

An L-shaped bracket 70 is fixed on the upper surface of the carrier 56 at the rear end thereof and is formed with a plurality of longitudinally-spaced-apart apertures 71 therethrough. An arm 72 is adapted to be removably engaged in a selected one of the apertures 71 for properly securing and positioning the wheel W as it is being moved about for attachment to the vehicle. An arcuate plate or segmental sleeve 74 is fixed on the extreme forward or outer end of the rod 72 and is formed for an engagement over the upper side of the wheel W on the rollers 68. The connection between the sleeve 74 and the carriage 56 by way of the link or rod 72 provides for the secure supporting of the wheel W on the carriage, as the carriage is being moved about for properly positioning the wheel W to be attached to the truck or other vehicle.

In the use and operation of the lifting device 10, the wheel W to be installed on the vehicle is initially placed on the rollers 68 with the platform and carriage in their lowered or retracted position. The segmental sleeve or plate 74 is then engaged over the upper end of the wheel W for supporting the wheel W erect during the movement of the platform 43 and carriage 56. Rotation of the crank 39 will provide for the extension of the jack 13 for lifting the guide frame or rail frame 17 vertically upwardly for properly positioning the wheel W in its selected vertical alignment with the hub on which it is to be supported. The platform 43 is then rolled or slid forwardly on the tracks or guide members 49 for positioning the wheel W very close to the hub, and the carriage 56 may be swung about the kingpins 60 to provide for the close adjustment or movement of the wheel W to be engaged on the hub. When the vertical and transverse disposition of the wheel W has been determined, the wheel and platform are then moved forwardly on the rails 49 until the studs of the hub are engaged in the openings of the wheel for securing the wheel thereon. When the wheel W is engaged on the hub and the studs thereof, the rod 72 may be disengaged from the bracket 70 and the sleeve or plate 74 removed from the upper side of the wheel W and the wheel may then be fixedly secured on its proper hub.

I do not mean to confine myself to the exact details of construction herein disclosed, but claim all variations falling within the purview of the appended claims.

I claim:

1. In a lifting device, a base frame having longitudinal side members, an upper frame overlying said base frame and having side members, vertically extensible and contractible jack means positioned between the side members of the base and upper frames for raising and lowering said upper frame relative to said base frame, a carriage rollably mounted on and positioned between the side members of said upper frame, a platform overlying said carriage, vertical axis crank means mounting said platform on said carriage and enabling said platform to be laterally and longitudinally displaced relative to said carriage, and work engaging means on said platform.

2. In a lifting device, a base frame having longitudinal side members, an upper frame overlying said base frame and having side members, vertically extensible and contractible jack means positioned between the side members of the base and upper frames for raising and lowering said upper frame relative to said base frame, a carriage rollably mounted on and positioned between the side members of said upper frame, a platform overlying said carriage, vertical axis crank means mounting said platform on said carriage and enabling said platform to be laterally and longitudinally displaced relative to said carriage, and work engaging means on said platform, said work engaging means comprising horizontal arms projecting beyond said platform.

3. In a lifting device, a base frame having longitudinal side members, an upper frame overlying said base frame and having side members, vertically extensible and contractible jack means positioned between the side members of the base and upper frames for raising and lowering said upper frame relative to said base frame, a carriage rollably mounted on and positioned between the side members of said upper frame, a platform overlying said carriage, vertical axis crank means mounting said platform on said carriage and enabling said platform to be laterally and longitudinally displaced relative to said carriage, and work engaging means on said platform, said work engaging means comprising horizontal arms projecting longitudinally beyond an end of said platform.

4. In a lifting device, a base frame having longitudinal side members, an upper frame overlying said base frame, and having side members, vertically extensible and contractible jack means positioned between the side members of the base and upper frames for raising and lowering said upper frame relative to said base frame, a carriage rollably mounted on and positioned between the side members of said upper frame, a platform overlying said carriage, vertical axis crank means mounting said platform on said carriage and enabling said platform to be laterally and longitudinally displaced relative to said carriage, and work engaging means on said platform, said jack means comprising scissor jacks having longitudinally extending operating screws, and operating means on one end of said base frame connected to both of the operating screws for operating the jacks together.

DAVID F. MINER.

REFERENCES CITED

The following references are of record in the file of this patent:

UNITED STATES PATENTS

| Number | Name | Date |
|---|---|---|
| 808,212 | Podmore | Dec. 26, 1905 |
| 1,535,762 | Brejska | Apr. 28, 1925 |
| 1,741,624 | Hansen | Dec. 31, 1929 |